United States Patent Office 3,399,207
Patented Aug. 27, 1968

3,399,207
ESTERS OF 6-AMINOPENICILLANIC ACID
Peter Bamberg, Bertil Åke Ekström, and Berndt Olof
 Harald Sjöberg, Sodertalje, Sweden, assignors to Aktiebolaget Astra, Sodertalje, Sweden, a company of Sweden
No Drawing. Filed Oct. 6, 1966, Ser. No. 584,647
Claims priority, application Great Britain, Nov. 12, 1965,
48,208/65
10 Claims. (Cl. 260—306.7)

This invention relates to organic compounds and to their preparation and is particularly concerned with the provision of a new class of esters of 6-aminopenicillanic acid and acid addition salts thereof, which are of value in the preparation of penicillins.

Only few esters of 6-aminopenicillanic acid have previously been described and these all have drawbacks which render difficult or impossible their use as intermediates in the production of penicillins by acylation of the amino group followed by removal of the ester group. Thus the methyl ester (B. K. Koe, Nature 195 (1962) 1200) is not suitable for use in the preparation of penicillins as the ester group can only be removed by using strong acid or alkaline hydrolysis, which conditions would lead to rapid inactivation of the penicillin (F. P. Doyle and J. H. C. Nayler in N. J. Harper and A. B. Simmons (Eds.) Advances in Drug Research, vol. 1, Academic Press, London-New York 1964 page 25 et seq.). The benzyl ester has been used for the preparation of guanidinoacylaminopenicillins (Belgian Patent No. 634,374), the ester group being removed by catalytic hydrogenation over a precious metal catalyst. The value of this ester as an intermediate is, however, limited as it is prepared by the use of phenyldiazomethane, a reagent known as being extremely dangerous especially when employed on a large scale. Furthermore removal of benzyl groups from penicillins by catalytic hydrogenation is made difficult because the catalyst becomes poisoned (F. P. Doyle, G. R. Foster, J. H. C. Nayler and H. Smith, J. Chem., Soc. 1962, 1440), and large amounts of the expensive catalyst have to be used to carry the reaction to completion. Trialkylsilylesters of 6-aminopenicillanic acid can also be used for the synthesis of penicillins (e.g. K. W. Glombitza, Liebigs, Ann. Chem., 673 (1964), 166). Although the trialkylsilyl group is well suited for protecting the carboxylic group of the amino penicillanic acid during the acylation, it is split off very rapidly on contact with water or other hydroxylic solvents with the result that it is impracticable to isolate and purify the primary acylation product by extraction.

Preparations of penicillins by acylation of 6-aminopenicillanic acid has previously generally been carried out by reacting suitable reactive derivatives of the acid appropriate to the desired side chain with an organic or inorganic salt of 6-aminopenicillanic acid in aqueous or organic solutions or suspensions. The products thus obtained are often contaminated with the free acid from which the side chain is derived, which is formed by hydrolysis of the reactive derivative during reaction or during working up and the acid cannot easily be removed, as its physicochemical properties are similar to those of the penicillin itself. In cases where the side chain contains a basic group, the product may contain as a further impurity unreacted 6-aminopenicillanic acid, which cannot be removed by extraction for the same reason.

The present invention in one aspect provides a novel class of esters of 6-aminopenicillanic acid which are valuable intermediates for the production of penicillins. This class of esters comprises compounds of the general formula:

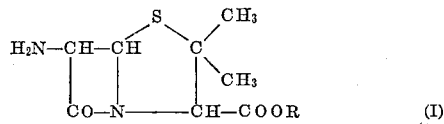

where R represents a phenacyl group which may be unsubstituted or substituted with at least one member of the groups consisting of halogen atom, lower alkyl group, lower alkoxy group and nitro group, and their acid additions salts. Such salts of compounds of Formula I may be derived from either inorganic or organic acids, for example hydrochloric acid or benzene sulphonic acid. The new esters according to the invention are illustrated by the following compounds: p-bromophenacyl-6-aminopenicillinate hydrochloride, the benzenesulphonic acid salt of p - bromophenacyl - 6 - aminopenicillinate, phenacyl - 6-aminopenicillinate hydrochloride, the benzenesulphonic acid salt of phenacyl-6-aminopenicillinate, the benzenesulphonic acid salt of p-methoxyphenacyl-6-aminopenicillinate, the benzenesulphonic acid salt of p-nitrophenacyl-6-aminopenicillinate, the benzenesulphonic acid salt of p - methylphenacyl - 6 - aminopenicillinate, p - chlorophenacyl-6-aminopenicillinate hydrochloride, the benzenesulphonic acid salt of p-chlorophenacyl-6-aminopenicillinate, m-chlorophenacyl-6-aminopenicillinate hydrochloride, the benzenesulphonic acid salt of m-chlorophenacyl-6-aminopenicillinate.

The esters of the invention may be converted into penicillins by reaction with an acylating agent capable of introducing the desired side chain on the nitrogen atom, purification of the product and removal of the phenacyl group and any other protecting groups present. If the side chain of the desired penicillin is neutral, the immediate acylation product of the penicillanic acid ester will also be a neutral compound, which may easily be freed from any acidic or basic impurity by extraction. Acidic groups in the side chain can be protected in the same way as the carboxylic group of 6-aminopenicillanic acid and primary and secondary amino groups can be masked by suitable protecting groups for example those known per se for this purpose in penicillin synthesis, so that in such cases also the immediate acylation product of the ester is neutral and thus easily purifiable. When a tertiary amine group is present in the side chain, an excess of the acylating agent can be used to ensure complete acylation of the 6-aminopenicillanic acid ester and the acylation product can be freed from excess of acylating agent by treatment with aqueous alkaline solutions, such as N sodium hydrogen carbonate solution.

After purification of the acylation product, the phenacyl groups may readily be removed by simple procedures, for example treatment with certain basic or nucleophilic agents such as sodium or potassium thiophenoxide, without any appreciable destruction of the penicillin molecule taking place. The penicillin may be obtained directly in crystalline form e.g. as the sodium or potassium salt.

According to a further aspect of the invention compounds of Formula I or acid addition salts thereof are produced by reacting a salt of 6-aminopenicillanic acid and an organic or inorganic base e.g. the sodium, potassium, calcium, or triethylamine salt, with a compound of the formula:

wherein R is as defined above and X is a halogen atom, for example a chlorine or bromine atom, or an organic sulphonic acid ester residue, for example, a p-toluenesulphonic acid residue, and, where an acid addition salt is required, reacting the resulting ester with an organic or inorganic acid. The reaction is desirably carried out in an organic solvent such as diethyleneglycol dimethyl ether, tetrahydrofurane, dimethylsulphoxide, dimethylformamide or mixtures thereof, especially a 1:1 mixture of dimethylformamide and tetrahydrofurane and the temperature is preferably held below +30° C., especially between —5° and 5° C.

This invention is illustrated by the following examples.

Example I

To an ice-cold, stirred suspension of 6-aminopenicillanic acid (21.6 g. 0.1 mole) and p-bromophenacyl bromide (27.8 g. 0.1 mole) in dry dimethylformamide (80 ml.), triethylamine (14 ml. 0.1 mole) was added dropwise over 15 min. Stirring and cooling was continued for 3 hours. Ethyl acetate (200 ml.) was added and the mixture was washed successively with saturated sodium bicarbonate and sodium chloride solution.

To the organic layer ice cold 2 N aqueous hydrogen chloride (200 ml.) was added with stirring. The resulting precipitate of p-bromophenacyl-6-aminopenicillinate hydrochloride was collected by filtration and thoroughly washed with ethyl acetate. The product (M.P. 150–155° C.) was obtained in an amount of 20 g. which corresponds to a yield of 45%. It showed a strong IR absorption band at 1785 cm.$^{-1}$ corresponding to the β-lactam system.

*Analysis.*—Calculated for $C_{16}H_{18}BrClN_2O_4S$: C, 42.6%; H, 403%; Br, 17.77%; Cl, 7.89%; N, 6.22%; O, 14.2%; S, 7.1%. Found: C, 42.82%; H, 4.36%; Br, 17.8%; Cl, 7.7%; N, 6.06%; O, 14.40%; S, 7.19%.

Example II

To an ice cold stirred suspension of 6-aminopenicillanic acid (21.6 g. 0.1 mole) in dry dimethylformamide (200 ml.), triethylamine (14 ml. 0.1 mole) was added dropwise over 10 minutes. p-Bromophenacyl bromide (28 g. 0.1 mole) in 200 ml. of dry tetrahydrofurane was added to the stirred solution. After stirring for 15 hours at 4° C. ethyl acetate (150 ml.) and water (250 ml.) was added. The aqueous layer was separated and extracted with ethyl acetate (100 ml.). The organic phases were combined and washed successively with sodium bicarbonate solution and saturated sodium chloride solution. After drying over magnesium sulphate and cooling to 0° C., benzenesulphonic acid (8 g.) in acetone (100 ml.) was added. A crystalline precipitate of the benzenesulphonic acid salt of p-bromophenacyl-6-aminopenicillinate was formed, which after thorough washing with acetone and drying weighed 24 g. Addition of benzenesulphonic acid (4 g.) in acetone (50 ml.) to the mother liquor yielded additional product (5 g.). Total yield amounted to 50.8% (based on the 6-aminopenicillanic acid). The IR-spectrum of the product exhibited a strong band at 1770 cm.$^{-1}$ corresponding to the β-lactam system.

*Analysis.*—Calculated for $C_{22}H_{23}BrN_2O_7S_2$: C, 46.24%; H, 406%; Br, 13.98%; N, 4.90; O, 1960%; S, 11.22%. Found: C, 46.51%; H, 402%; Br, 14.16%; N, 4.75%; O, 1942%; S, 11.03%.

Example III

The benzenesulphonic acid salt of the phenacyl ester of 6-aminopenicillanic acid was prepared in the manner described in Example II starting from 6-aminopenicillanic acid (21.6 g.), triethylamine (14 ml.) and phenacyl bromide (20 g.). The salt was obtained in an amount of 18 g. which corresponds to a yield of 37%. The IR-spectrum of the compound exhibited a strong band at 1800 cm.$^{-1}$, corresponding to the β-lactam system.

*Analysis.*—Calculated for $C_{22}H_{23}N_2O_7S_2$: C, 53.64%; H, 4.91%; N, 5.69%; O, 22.74%; S, 13.02%. Found: C, 53.60%; H, 508%; N, 5.50%; O, 22.62%; S, 12.91%.

Example IV

The benzenesulphonic acid salt of the p-methoxyphenacyl ester of 6-aminopenicillanic acid was prepared in the manner described in Example III starting from 6-aminopenicillanic acid (21.6 g.) triethylamine (14 ml.) and p-methoxyphenacyl bromide (22.9 g.) The salt was obtained in an amount of 14.5 g. which corresponds to a yield of 28%.

*Analysis.*—Calculated for $C_{23}H_{26}N_2O_8S_2$: C, 52.86; H, 5.02%; N, 5.36%; O, 24.49%; S, 12,27%. Found: C, 52.84%; H, 5.22%; N, 5.17%; O, 24.36%; S, 12.10%.

Example V

The benzenesulphonic acid salt of p-nitrophenacyl ester of 6-aminopenicillanic acid was prepared in the manner described in Example III from 6-aminopenicillanic acid (21.6 g.), p-nitrophenacyl bromide (24. 5 g.) and triethylamine (14 ml.). The salt was obtained in an amount of 11 g., which corresponds to a yield of 20%. The IR-spectrum of the compound exhibited a strong band at 1780 cm.$^{-1}$ corresponding to the β-lactam system.

*Analysis.*—Calculated for $C_{22}H_{23}N_3O_9S_2$: C, 49.15%; H, 4.31%; N, 7.82%; O, 26.79%; S, 11.93%. Found: C, 48.99%; H, 4.50%; N, 7.75%; O, 26.65%; S, 12.17%.

What is claimed is:

1. 6-aminopenicillanic acid esters of the formula:

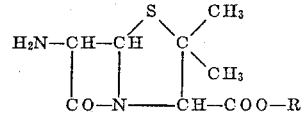

wherein R is a radical selected from the group consisting of unsubstituted and substituted phenacyl radicals, said substituted phenacyl radicals containing at least one member selected from the group consisting of halide, lower alkyl, lower alkoxy, and nitro radicals.

2. Hydrochloric acid addition salts of the 6-aminopenicillanic acid esters set forth in claim 5.

3. Benzene sulfonic acid addition salts of the 6-aminopenicillanic acid esters set forth in claim 5.

4. A process for preparing 6-aminopenicillanic acid esters, comprising adding to 6-aminopenicillanic acid a base selected from the group consisting of organic and inorganic bases, and a compound of the formula:

X—R wherein R is a radical selected from the group consisting of unsubstituted and substituted phenacyl radicals, said substituted phenacyl radicals containing at least one member selected from the group consisting of halide, lower alkyl, lower alkoxy and nitro radicals, and X is a radical selected from the group of halogen atoms and monocarbocyclicaryl sulfonic acid radicals, said reaction taking place in an organic solvent at moderate temperature to form a compound of the formula:

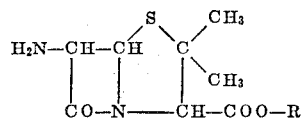

wherein R has the same meaning as above.

5. A process as set forth in claim 4, wherein said organic solvent is at least one member of the group consisting of diethylene-glycol-dimethylether, tetrahydrofurane, dimethylsulfoxide, and dimethylformamide.

6. A process as set forth in claim 4, wherein said organic solvent is a mixture of substantially equal portions of dimethylformamide and tetrahydrofurane.

7. A process as set forth in claim 4, wherein the temperature is held below 30° C.

8. A process as set forth in claim 4, wherein said base is selected from the group consisting of alkali hydroxide, alkaline earth hydroxide and lower trialkylamine.

9. A process as set forth in claim 4, wherein hydrochloric acid is added to the 6-aminopenicillanic acid esters to form the hydrochloric acid addition salts of the 6-aminopenicillanic acid esters.

10. A process as set forth in claim 4, wherein benzene sulfonic acid is added to the 6-aminopenicillanic acid esters to form the benzene sulfonic acid addition salt of the 6-aminopenicillanic acid esters.

References Cited

UNITED STATES PATENTS 3,173,911   3/1965   Hoover _____ 260—239.1

NICHOLAS S. RIZZO, *Primary Examiner.*

UNITED STATES PATENT OFFICE
CERTIFICATE OF CORRECTION

Patent No. 3,399,207                            August 27, 1968

Peter Bamberg et al.

It is certified that error appears in the above identified patent and that said Letters Patent are hereby corrected as shown below:

Column 3, line 32, for "403" read -- 4.03 --; line 60, for "406" read -- 4.06 --; same line 60, for "1960" read -- 19.60 -- line 61, for "402" read -- 4.02 --; line 62, for "1942" read -- 19.42 --; line 73, for "$H_{23}$" read -- $H_{24}$ --; line 75, for "508" read -- 5.08 --; column 4, lines 40 and 42, for the claim reference numeral "5", each occurrence, read -- 1 --.

Signed and sealed this 22nd day of July 1969.

(SEAL)
Attest:

Edward M. Fletcher, Jr.
Attesting Officer

WILLIAM E. SCHUYLER, J
Commissioner of Paten